(12) United States Patent
Leete (10) Patent No.: US 6,748,466 B2
(45) Date of Patent: Jun. 8, 2004

(54) METHOD AND APPARATUS FOR HIGH THROUGHPUT SHORT PACKET TRANSFERS WITH MINIMUM MEMORY FOOTPRINT

(75) Inventor: Brian A. Leete, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 409 days.

(21) Appl. No.: 09/895,461

(22) Filed: Jun. 29, 2001

(65) Prior Publication Data

US 2003/0005190 A1 Jan. 2, 2003

(51) Int. Cl.[7] ................................. G06F 3/06
(52) U.S. Cl. ..................... 710/52; 710/30; 710/52; 710/48; 711/115; 711/170
(58) Field of Search ................ 710/6, 13, 33, 710/52, 56, 36, 112, 30, 54, 48, 266; 707/101; 711/100, 115, 170; 709/231, 232

(56) References Cited

U.S. PATENT DOCUMENTS

| | | | | |
|---|---|---|---|---|
| 5,832,492 A | * | 11/1998 | Wooten | 707/101 |
| 5,870,627 A | * | 2/1999 | O'toole et al. | 395/842 |
| 6,061,687 A | * | 5/2000 | Wooten | 707/101 |
| 6,070,204 A | * | 5/2000 | Poisner | 710/100 |
| 6,421,769 B1 | * | 7/2002 | Teienberg et al. | 711/170 |
| 6,473,808 B1 | * | 10/2002 | Yeivin et al. | 710/6 |
| 6,556,506 B2 | * | 4/2003 | Naven | 365/233 |

* cited by examiner

Primary Examiner—Fritz Fleming
Assistant Examiner—Rijue Mai
(74) Attorney, Agent, or Firm—Blakely, Sokoloff, Taylor & Zafman LLP (57) ABSTRACT

A device is presented including a host controller. A host controller driver is connected to the host controller. The host controller arranges queue element transfer descriptors (qTDs) in a circularly linked order. Also presented is a method including determining whether execution of a first queue element transfer descriptor (qTD) in a first bank including many qTDs results in a short packet condition. Following an alternate pointer in the first bank that points to a second bank if execution of the first qTD resulted in the short packet condition. Following a next pointer to a second qTD in the first bank if the execution of the first qTD completed normally. Also executing the second qTD in the first bank. The qTDs in the first bank and the second bank are circularly linked.

10 Claims, 8 Drawing Sheets

METHOD AND APPARATUS FOR HIGH THROUGHPUT SHORT PACKET TRANSFERS WITH MINIMUM MEMORY FOOTPRINT

BACKGROUND OF THE INVENTION

1. Field of the Invention

This invention relates to a universal serial bus (USB) environment, and more particularly to a method and apparatus to improve an enhanced host controller interface (EHCI) performance for USB devices.

2. Description of the Related Art

In many of today's processors and systems, such as personal computer (PC) systems, there exist USB ports for connecting various USB devices. Many USB devices are frequently used by PC users. For example, USB devices may be printers, compact disc read-only memory (CD-ROM) drives, CD-ROM writer (CDRW) drives, digital versatile disc (DVD) drives, cameras, pointing devices (e.g., computer mouse), keyboards, joy-sticks, hard-drives, speakers, etc.

Different standards of USB technology have different bandwidths. For example, Universal Serial Bus Specification, revision 1.1, Sep. 23, 1998 (USB 1.1) devices are capable of operating at 12 Mbits/second (Mbps), and Universal Serial Bus Specification, revision 2.0, Apr. 27, 2000 (USB 2.0; also known as high-speed USB) devices are capable of operating at 480 Mbps. USB 2.0 defines a multiple speed-signaling environment where a single high-speed bus may support one or more USB 1.1 classic busses through a USB 2.0 hub (Transaction Translator). In this environment, system software (the Host Controller Driver) must allocate and manage the bandwidth of USB 1.1 classic busses.

The Enhanced Host Controller Interface (EHCI) specification for a Universal Serial Bus, revision 0.95, Nov. 10, 2000 describes the register-level interface for a host controller (HC) for USB 2.0. The USB 2.0 HC is a bus master on the peripheral component interconnect (PCI) bus. The HC independently traverses linked memory structures created and maintained by the HC driver to initiate transactions on the USB. In the USB EHCI specification, two data structures known as the queue head (QH) and the queue element transfer descriptor (qTD) are defined.

The QH contains all of the endpoint specific information required. The QH also contains links to a list of qTDs. A qTD represents all or part of a buffer passed to the HC driver from a higher level driver, or user level application. The QH contains all of the endpoint specific information required. The QH also contains links to a list of qTDs. A qTD represents all or part of a buffer passed to the HC driver from a higher level driver, or user level application.

The qTD data structure is only used with a QH. The qTD is used for one or more USB transactions. A qTD can, at most, transfer 20,480 (5*4,096) bytes. When the HC completes execution of a qTD, it will follow the next-pointer. When a USB device returns less data than requested by the qTD, a short packet condition results. When the HC receives a short packet, the HC follows the alternate-pointer.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION OF THE INVENTION

The invention generally relates to a method to reducing memory consumption of universal serial bus (USB) data structures and improving throughput of USB transactions. Referring to the figures, exemplary embodiments of the invention will now be described. The exemplary embodiments are provided to illustrate the invention and should not be construed as limiting the scope of the invention.

Figure 1:
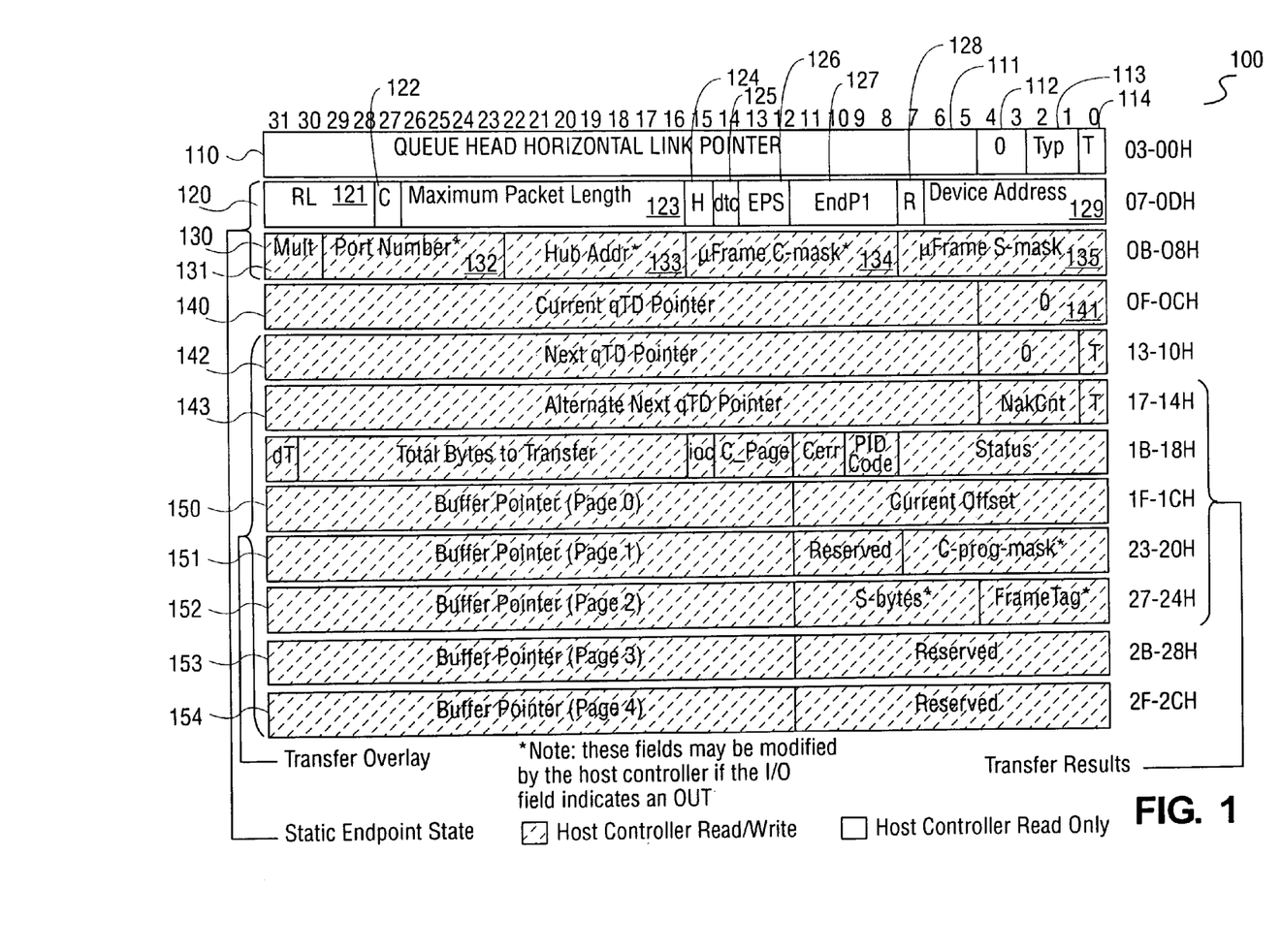
FIG. 1 illustrates a structure of a queue head.

FIG. 1 illustrates a typical structure layout of a queue head (QH). QH horizontal link pointer (QHLP) 110 comprises four fields. QHLP field 111 contains the address of the next data object to be processed in the horizontal list and corresponds to memory address signals [31:5], respectively. Field 112 is reserved, and bits 4:3 must be written as 0s. Field 113 comprising bits 2:1, indicates to the hardware whether the item referenced by the link pointer is a isochronous transaction descriptor (iTD), split transaction isochronous transaction descriptor (siTD) or a QH. Field 113 allows the USB host controller to perform the proper type of processing on the item after it is fetched. Field 114, bit 0, is the terminate field. If the QH is in the context of the periodic list, a set ("1") bit in field 114 indicates to the HC that this is the end of the periodic list. This bit, however, is ignored by the HC when the QH is in the asynchronous schedule.

Field 120 illustrates QH DWord1, and field 130 illustrates end point characteristics comprising QH DWord2. Field 121 is the not acknowledged or negative acknowledged (Nak) count re-load field. Field 121 contains a value, which is used by the HC to reload Nak counter field. Field 133 illustrates a control end-point flag. Field 123 represents the maximum packet length. The maximum packet length directly corresponds to the maximum packet size of the associated endpoint. The maximum value of field 123 is 0×400 (1024).

Field 124 illustrates head of reclamation list flag. Field 124 is set by system software to mark a QH as being the head of the reclamation list. Field 125 illustrates data toggle control. Field 125 specifies where the HC should get the initial data toggle on an overlay transition. Field 126 illustrates endpoint speed. Field 126 is the speed of the associated endpoint. Field 127 illustrates the endpoint number. Field 127 selects the particular endpoint number on the device serving as the data source or sink. Field 128 is a reserved bit. Field 129 illustrates the device address. Field 129 selects the specific device serving as the data source or sink.

Field 131 illustrates the high-bandwidth pipe multiplier. Field 131 is a multiplier used to key the HC as the number of successive packets the HC may submit to the endpoint in the current execution. The HC makes the simplified assumption that software properly initializes this field. Field 132 illustrates the port number. Field 132 is ignored by the HC unless field 126 indicates a full-speed or low-speed device. The value is the port number identifier on the USB 2.0 hub, below which the full- or low-speed device associated with this endpoint is attached. This information is used in the split-transaction protocol.

Field 133 illustrates the hub address. Field 133 is ignored by the HC unless field 126 indicates a full- or low-speed device. The value is the USB device address of the USB 2.0 hub below which the full- or low-speed device associated with this endpoint is attached. Field 134 illustrates the split-completion mask. Field 134 is ignored by the HC unless field 126 indicates the device is a low- or full-speed device and this QH is in the periodic list. Field 134 is used to determine during which micro-frames the HC should execute a complete-split transaction. When the criteria for using this field are met, a zero value in this field has undefined behavior. Field 135 illustrates the interrupt schedule mask. Field 135 is used for all endpoint speeds. When the QH is on the asynchronous schedule, software should set this field to a zero ("0"). A non-zero value in this field indicates an interrupt endpoint.

Field 140 illustrates the current queue transaction descriptor link pointer. Field 140 contains the address of the current transaction being processed in this queue and corresponds to memory address signals [31:5], respectively. Field 141 is reserved for future use. Field 142 illustrates the next queue element transfer descriptor (qTD) pointer. Field 143 illustrates the alternate next qTD pointer. Fields 150 through 154 illustrate buffer pointer pages 0–4, respectively.

Figure 2:
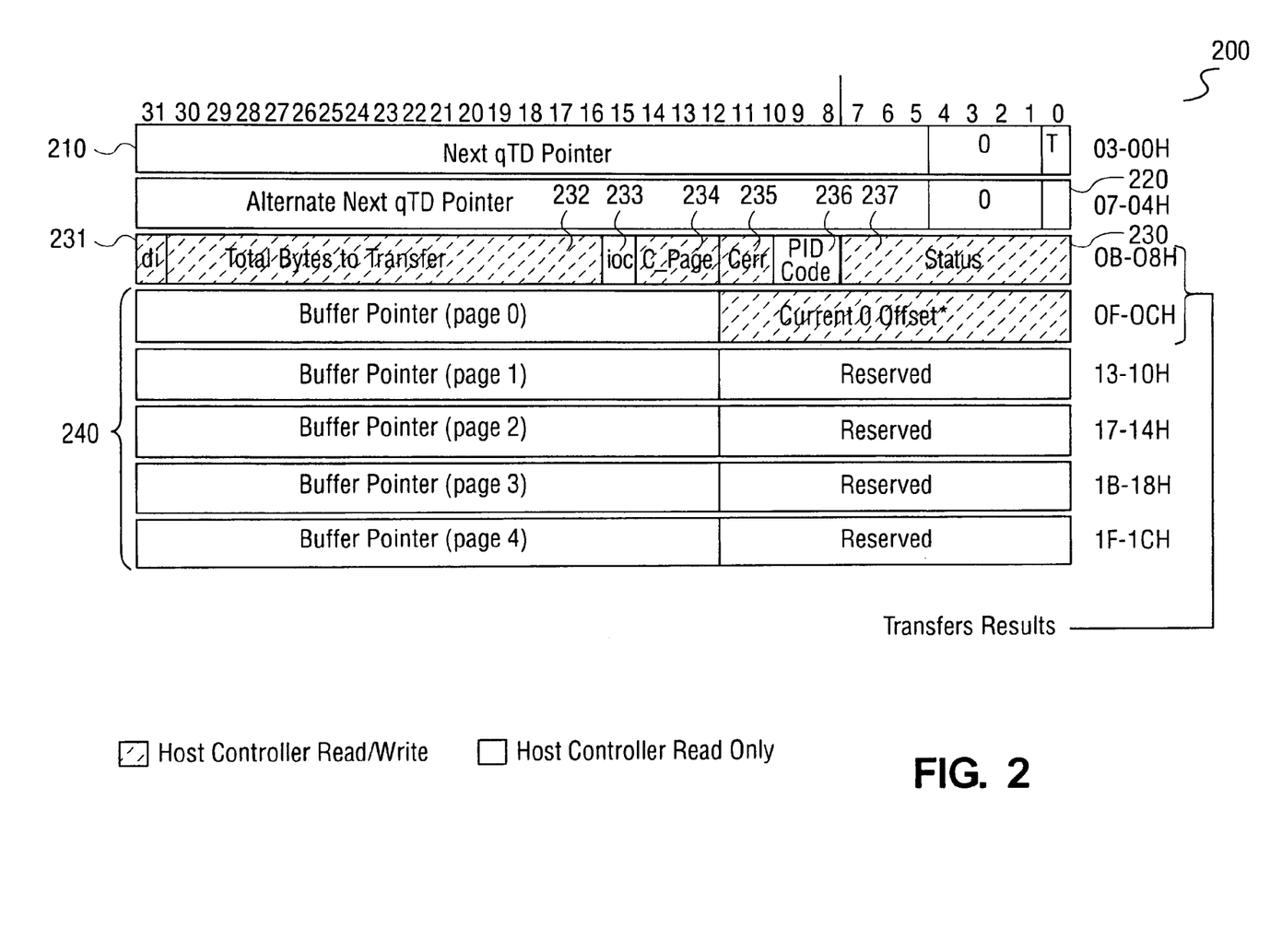
FIG. 2 illustrates a structure of a queue element transfer descriptor (qTD).

FIG. 2 illustrates the structure of a qTD. As can be seen in FIG. 2, a qTD contains two structure pointers (next qTD pointer 210 and alternate next qTD pointer 220) which are used for queue advancement, a data word (Dword) of transfer state (230), and a five-element array of data buffer pointers (240). The complete structure of qTD 200 consists of 32 bytes. Next qTD pointer 210 and alternate next qTD pointer 220 point to the next qTD to execute. Next qTD pointer 210 contains the physical memory address of the next qTD to be processed.

Bit 0 in qTD pointer 210 is the terminate field. If bit 0 of qTD pointer 210 is set ("1"), bit 0 indicates the pointer is invalid. If bit 0 of qTD pointer 210 is not set ("0"), the pointer is valid. Alternate qTD pointer 220 contains the physical memory address of the next qTD to be processed in the event that the current qTD execution encounters a short packet. Like qTD pointer 210, alternate qTD pointer 220 has bit 0 as a terminate bit. The third Dword 230, known as the qTD token, contains most of the information the HC needs to execute a USB transaction.

Bit 0 is data toggle sequence bit 231. The use of data toggle sequence bit 231 depends on the setting of the data toggle control bit (illustrated as 125 in FIG. 1) in the QH. Total bytes to transfer 232 specifies the total number of bytes to be moved with the particular transfer descriptor. Total bytes to transfer 232 is decremented by the amount of bytes actually moved during the transaction. If the interrupt on complete (IOC) 233 bit is set ("1"), then when the particular qTD execution is completed, the HC should issue an interrupt at the next interrupt threshold. Current page 234 is used as an index into the qTD buffer pointer list.

Error counter 235 is a 2-bit down counter that keeps track of the number of consecutive errors detected while executing the particular qTD. Program identification (PID) code 236 is an encoding of the token that should be used for transactions associated with the particular transfer descriptor. Status 237 is used by the HC to communicate individual command execution states back to the HC driver. Status 237 contains the status of the last transaction performed on the particular qTD. Each buffer pointer in buffer pointer list 240 contains a 4 K page aligned, physical memory address. The lower bits (0–12) are reserved in all pointers except the first one (i.e., page 0).

Figure 3:
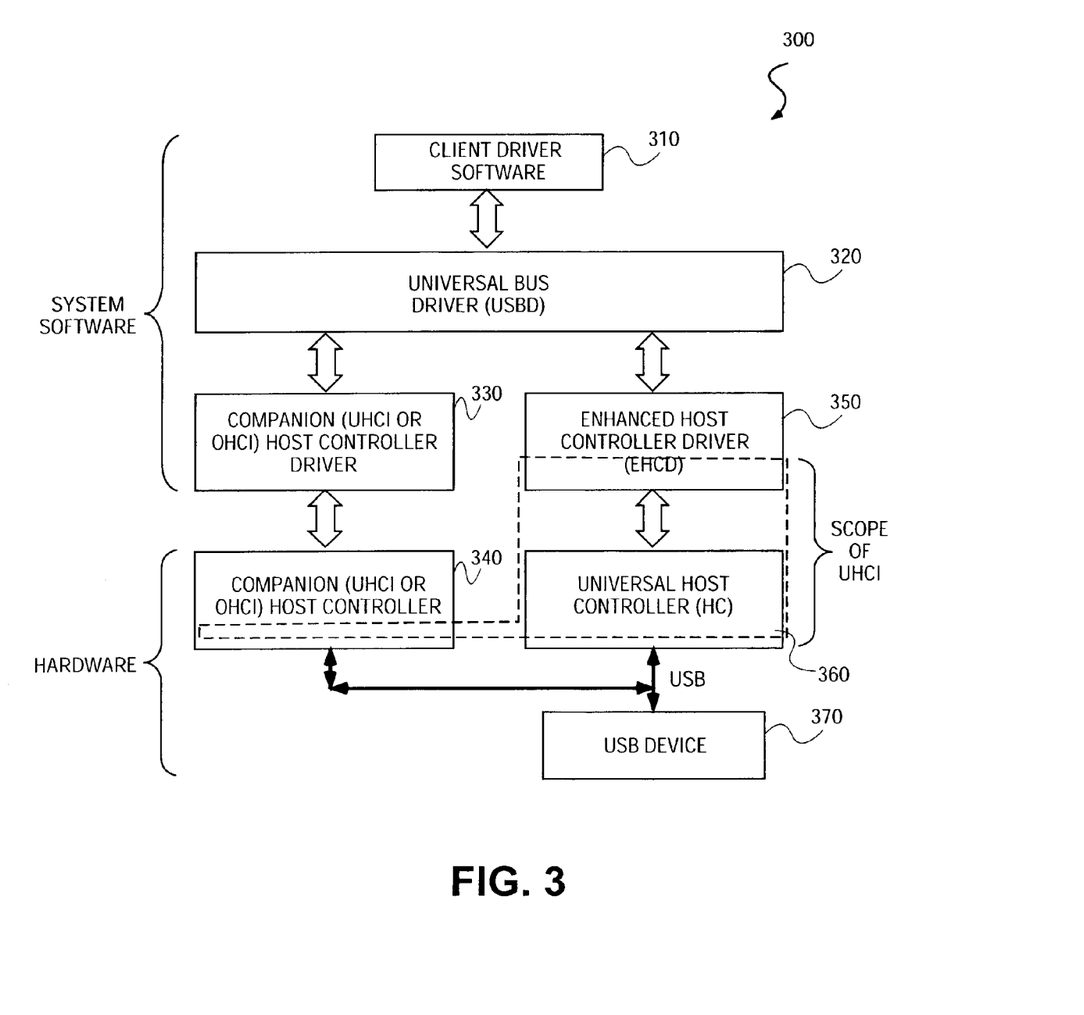
FIG. 3 illustrates a Universal Serial Bus (USB) 2.0 system.

A USB host system is composed of a number of hardware and software layers. FIG. 3 illustrates a block diagram of building block layers in a USB 2.0 system. System 300 is comprised of client driver software 310, universal serial bus driver (USBD) 320, companion host controller (HC) driver 330, companion HC 340, enhanced host controller driver (EHCD) 350, universal host controller (UHC) 360 and USB device 370. In system 300, system software consists of client driver software 310, USBD 320, companion HC driver 330, and EHCD 350. In system 300 the hardware comprises companion HC 340, UHC 360, and USB device 370.

Client driver software 310 typically executes on the host personal computer (PC) corresponding to a particular USB device. Client driver software 310 is typically part of the operating system (OS) or may be provided with a USB device. USBD 320 is a system bus driver that abstracts the details of the particular HC driver for a particular OS. Companion HC Driver 330 is typically a UHC interface (UHCI) driver or an open HCI (OHCI) driver for USB. The HC driver provides a software layer between specific HC hardware and the USBD. Companion HC 340, is typically UHCI or OHCI standards. Companion HC 340 is the specific hardware implementation of the HC. There is one HC specification for USB 2.0 functionality, and two specifications for full- and low-speed HCs.

Figure 4:
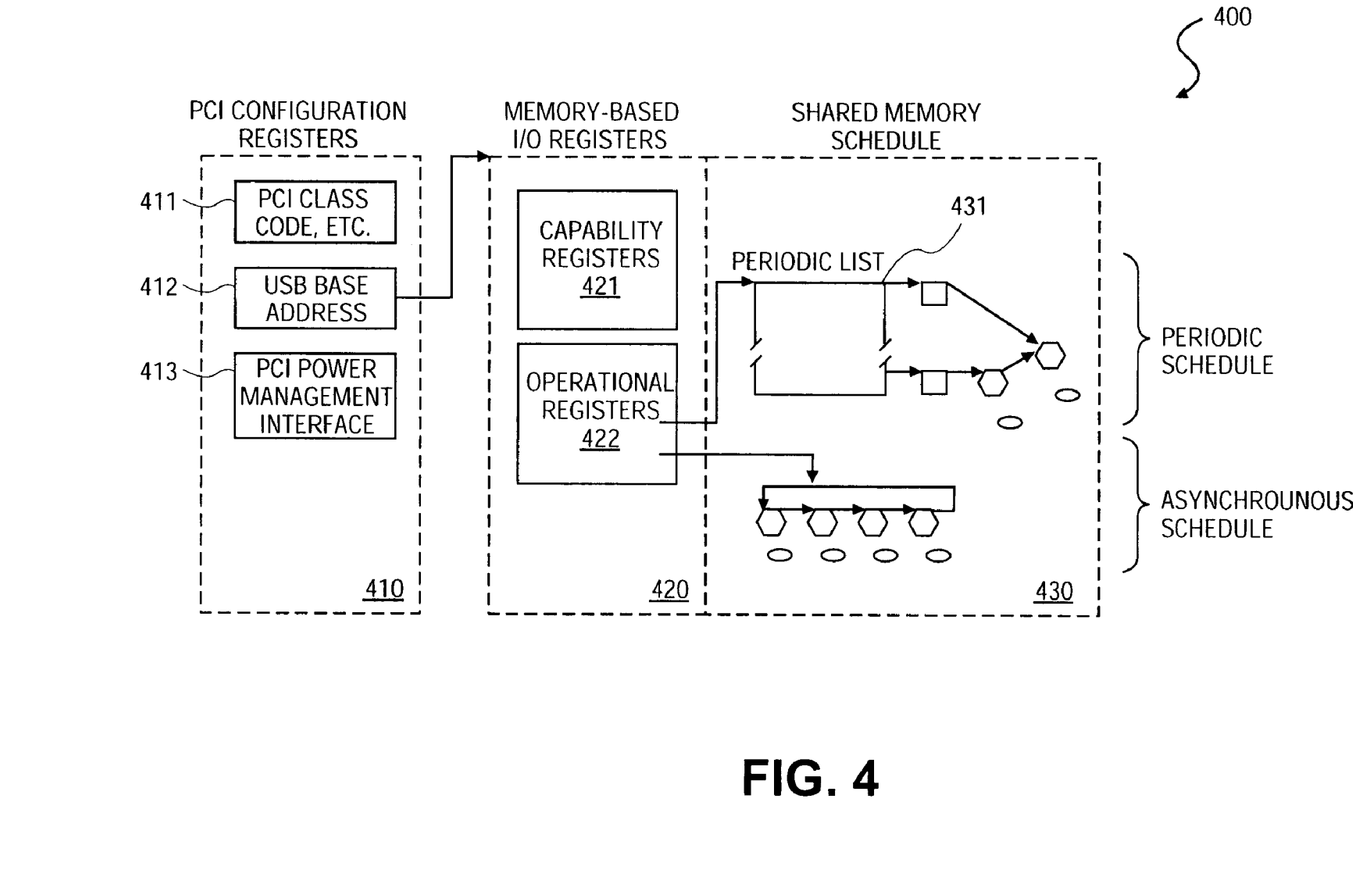
FIG. 4 illustrates an enhanced host controller interface (EHCI).

FIG. 4 illustrates the general architecture of enhanced host controller interface (EHCI) 400. EHCI 400 comprises three interface spaces: peripheral component interconnect (PCI) configuration 410, register 420, and schedule interface 430. PCI configuration 410 includes PCI registers used for system component enumeration and PCI power management. PCI configuration registers in PCI configuration 410 comprise PCI class code 411, USB base address 412, and PCI power management interface 413. Register 420 comprises memory based input/output (I/O) registers. Memory based I/O registers are comprised of capability registers 421 and operational registers 422. Register 420 must be implemented as memory-mapped I/O. Schedule interface 430 is typically memory allocated and managed by the HC driver for the periodic and asynchronous schedules. EHCI 400 allows software to enable or disable each schedule.

Figure 5:
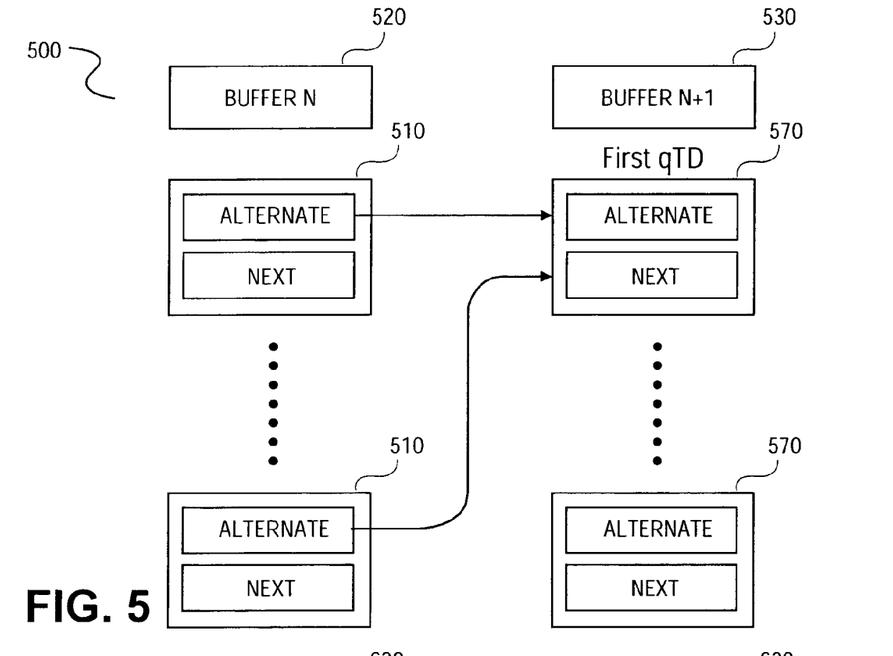
FIG. 5 illustrates a first method for organizing qTDs.

There are typically two (2) methods for organizing qTDs. FIG. 5 illustrates the first method. In the method illustrated in FIG. 5, all of the qTDs 510 necessary to represent at least two buffers are created. Each alternate-pointer of buffer N 520 points to the first qTD 510 of buffer N+1 530. This method, however, requires a large memory footprint to initialize all of the qTDs 510 required to represent both buffers.

Figure 6:
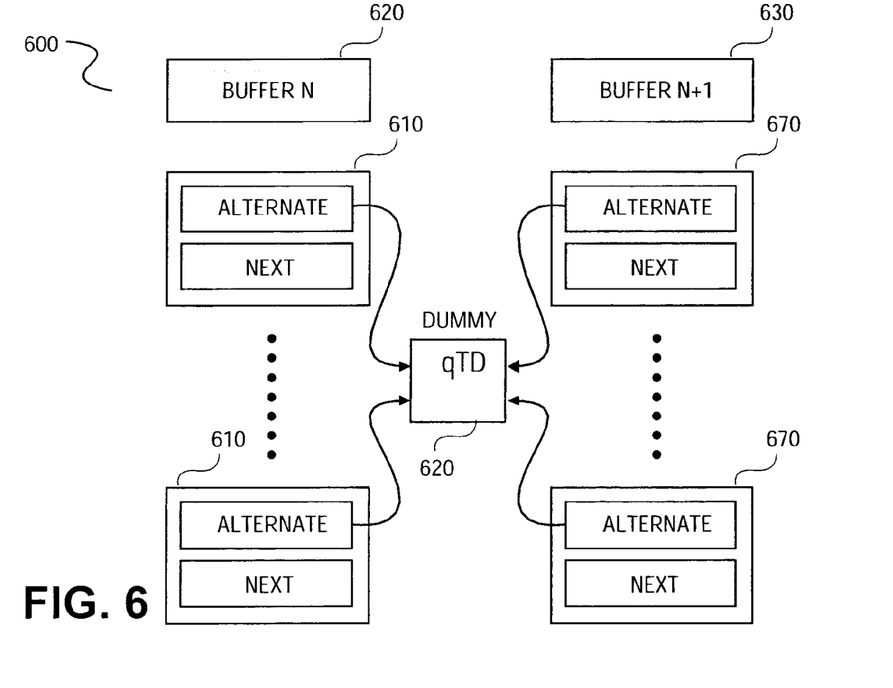
FIG. 6 illustrates a second method for organizing qTDs.

FIG. 6 illustrates the second method. The second method initializes all the alternate-pointers of the qTDs 510 to a "dummy" qTD. When a short packet is received, the HC will vector to dummy qTD 620. Software then detects the short packet and re-initializes qTDs 610. The software can only detect a short packet condition when the hardware asserts an interrupt. Since interrupts occur at fixed intervals, the time after the short packet is received and before the interrupt is serviced is unused. Therefore, this second approach, while having a small memory footprint, has low throughput.

Figure 7:
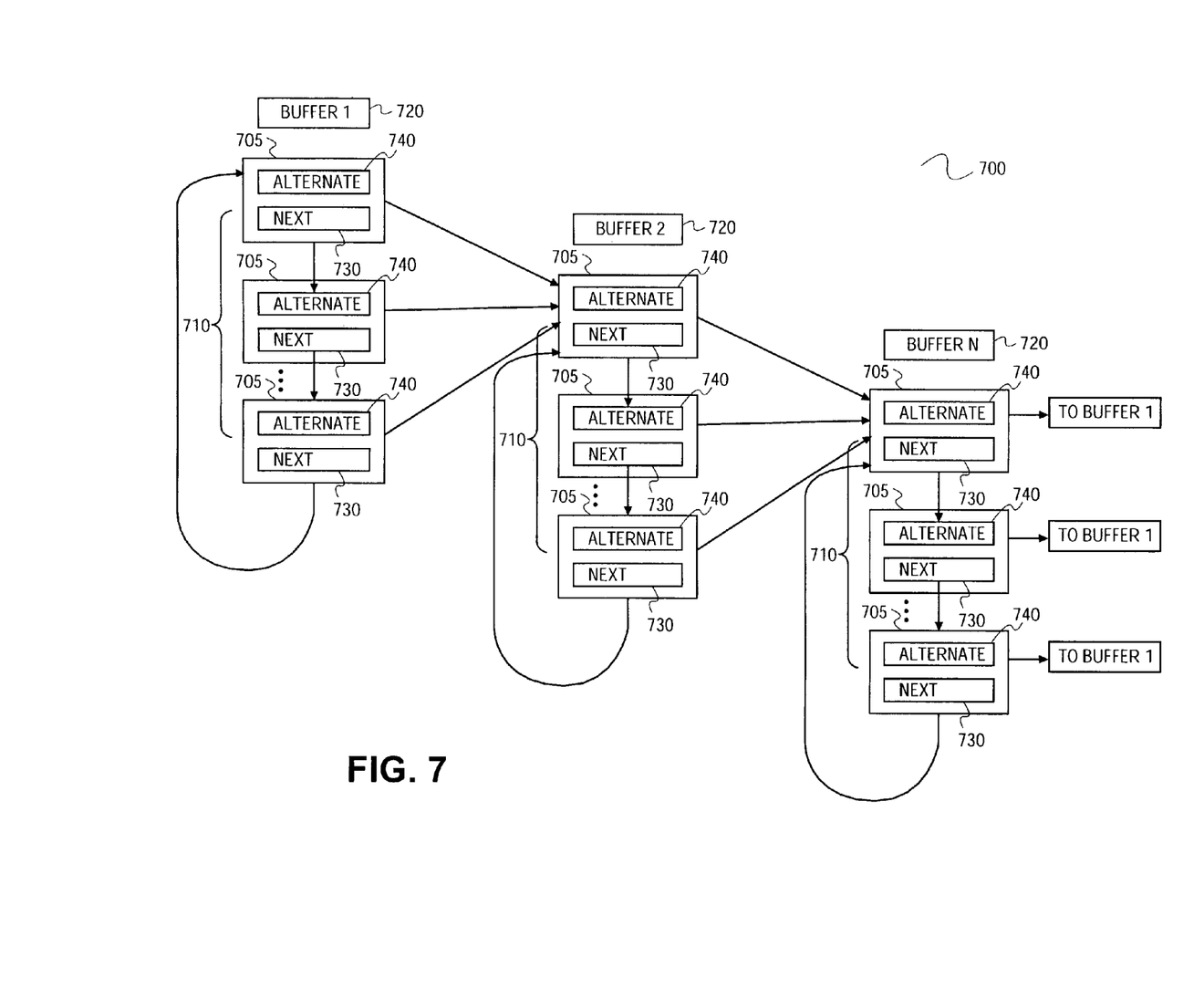
FIG. 7 illustrates an embodiment of the invention that organizes qTDs to improve throughput in the presence of short packets.

FIG. 7 illustrates a block diagram of an embodiment of the invention comprising N small banks of qTDs 710 for each buffer 720 posted to the HC driver. In this embodiment of the invention, N may be a small number such as "3" (three). One should note that N can be other numbers besides 3. Each bank of qTDs 710 is circularly linked. Next-pointer 730 in each qTD 705 points to the next qTD 705 in qTD bank 710. The last next-pointer 730 in a qTD 705 points to the first qTD 705 in qTD bank 710. Alternate-pointer 740 of each qTD 705 in qTD bank 710 points to the first qTD 705 in the next bank of qTDs (representing the next sequential buffer posted to the HC driver). In this embodiment of the invention, as the HC consumes data from qTDs 705 and executes transactions on the USB, the HC driver continually re-initializes and re-uses the statically defined qTDs corresponding to the buffer currently active.

When the HC driver initializes the last qTD's buffer, the HC driver sets the next-pointer in the last initialized qTD and begins servicing the qTDs in buffer N+1. If any of qTDs 705 in buffer N 720 terminate with a short packet, the HC will follow the alternate-pointer to the first qTD of buffer N+1. The same pattern continues for N buffers. This embodiment of the invention can be incorporated into a USB HC (e.g., USB 2.0 enhanced host controller) coupled with a USB HC driver (e.g., an enhanced host controller driver). This embodiment can also be incorporated into a USB system, such as USB 2.0 system 300 illustrated in FIG. 3.

In one embodiment of the invention, for buffer contents that are smaller than the maximum contents that can fit into N small banks of qTDs 710 (e.g., N=3), the HC reads the first qTD for the first buffer. If the execution of the first qTD completes normally, the HC follows the next pointer and executes the transactions contained in the second qTD. Since the last qTD in the transfer has the next pointer pointing to the next buffer, the HC will vector to the next buffer when the execution of the qTD completes. If the buffer returns a short packet, the HC follows the alternate pointer to execute the next buffer.

In one embodiment of the invention, for buffer contents larger than the maximum contents that can fit into N small banks of qTDs 710 (e.g., N=3), The HC first reads the first qTD in the first buffer. After the first qTD completes execution, the HC asserts an interrupt to the HC driver. The HC then begins executing the transactions contained in the second qTD. The HC driver simultaneously clears out status in the first qTD and re-initializes it for the next section of the buffer (i.e., it would be the fourth qTD's worth of information). The HC driver will continue initializing/re-initializing and reusing the three ("3") qTDs (where N=3) until either the buffer "shorts out," and the HC vectors off to the next buffer via the alternate pointer, or until the transfer completes normally (in which case the HC driver has modified the next pointer to point to the next bank, not to the next qTD in the same bank).

Figure 8A:
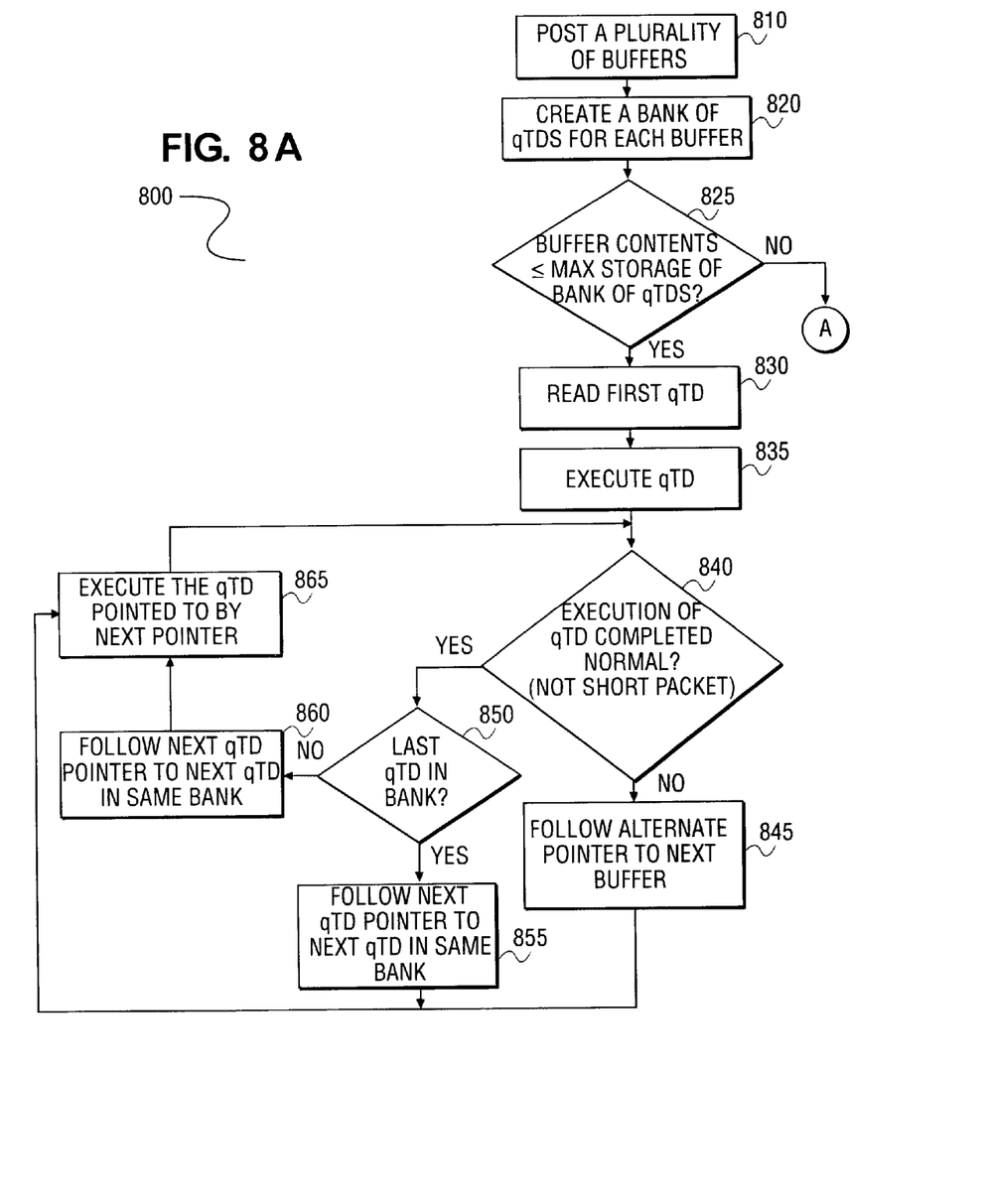
FIG. 8A illustrates a block diagram of a process of an embodiment of the invention that organizes qTDs to improve throughput in the presence of short packets when buffer contents are less than or equal to the storage capacity of qTDs in a bank.

FIG. 8A illustrates a block diagram of a process of an embodiment of the invention that organizes qTDs to improve throughput in the presence of short packets when buffer contents are less than or equal to the storage capacity of qTDs in a bank. Process 800 begins with block 810 where a plurality of buffers posted to the HC driver. Block 820 then creates a bank of N qTDs for each buffer posted (N is a number, e.g., 3). Block 825 determines whether the size of the contents of the buffer is less than or equal to the maximum storage capacity of the qTDs in the bank. If block 825 does determine that the size of the contents of the buffer is less than or equal to the maximum storage capacity of the qTDs in the bank, process 800 continues with block 830.

Block 830 reads the first qTD for the associated buffer. Block 835 executes the qTD. Process 800 continues with block 840 that determines whether execution of the qTD completed normally (i.e., not a short packet condition). If block 840 determines that execution of the qTD completed normally, process 800 continues with block 850. Block 850 determines whether the current qTD is the last qTD in the bank. If block 850 determines that the qTD recently executed is not the last qTD in the bank, process 800 continues with block 860. Block 860 follows the next qTD pointer to the next qTD in the same bank. Block 865 then executes the next qTD that is pointed to by the next pointer. Process 800 then continues with block 840.

If block 850 determines that the qTD recently executed is the last qTD in the bank, process 800 continues with block 855. Block 855 follows the next qTD pointer to the next qTD in the same bank. Process 800 then continues with block 825. One should note that the next buffer that is vectored to increments up to the last buffer. After the last buffer is vectored to, the next buffer to be vectored to would be the first buffer. For example, in a three ("3") buffer configuration, after buffer "3," buffer "1" is vectored back to.

If block 840 determines that the execution of the qTD did not complete normally, i.e. a short packet condition, process 800 continues with block 845. Block 845 follows the alternate pointer to the next buffer. Process 800 then continues with block 825. If block 825 determines that the size of the contents of the buffer is greater than the maximum storage capacity of the qTDs in the bank, process 800 continues with block 870 (illustrated in FIG. 8B).

Figure 8B:
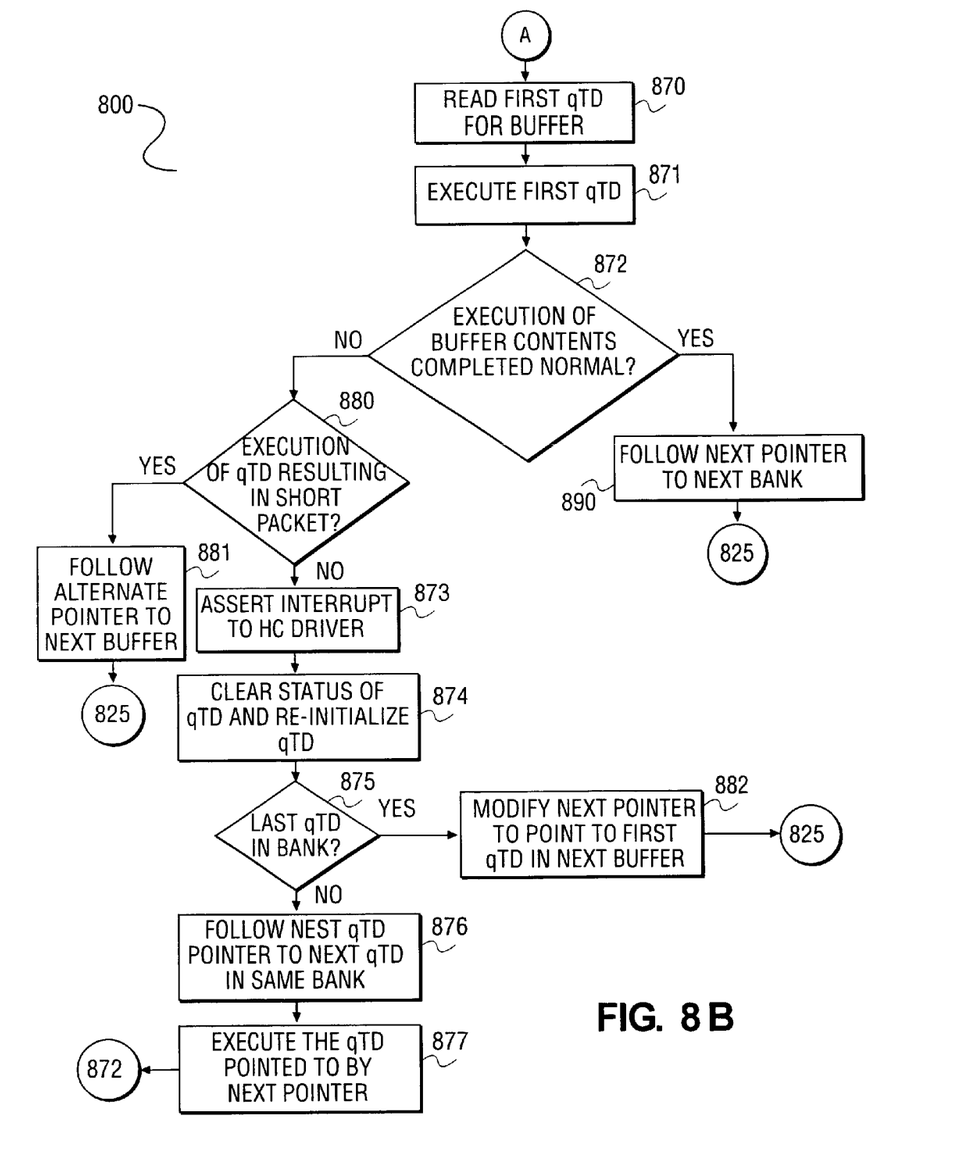
FIG. 8B illustrates a block diagram of a process of an embodiment of the invention that organizes qTDs to improve throughput in the presence of short packets when buffer contents are greater than the storage capacity of qTDs in a bank (continued from FIG. 8A).

Block 870 reads the first qTD for the respective buffer. Block 871 then executes the first qTD. Block 872 determines whether the execution of the contents of the buffer completed normally (not "shorted out" by a short packet condition). If block 872 determines that the execution of the contents of the buffer completed normally (i.e., all contents executed), then process 800 continues with block 890. Block 890 follows the next pointer to the next bank. The next pointer to the next bank increments up until the last bank, then the next pointer points to the first bank.

If block 872 determines that the execution of the buffer contents are not completed, process 800 continues with block 880. Block 880 determines whether execution of the current qTD resulted in a short packet condition. If block 880 determines that the execution of the current qTD resulted in a short packet condition, then process 800 continues with block 881. Block 881 follows the alternate pointer to the next buffer. Process 800 then continues with block 825.

If block 880 determines that the execution of the current qTD did not result in a short packet condition, process 800 continues with block 873. Block 873 asserts an interrupt to the HC driver. In block 874, the HC driver clears the status of the qTD while simultaneously re-initializing the qTD.

Process 800 continues with block 875 that determines whether the current qTD is the last qTD in the bank. If block 875 determines that the current qTD is the last qTD in the bank, process 800 continues with block 882. Block 882 modifies the next pointer to point to the first qTD in the next buffer. Process 800 then continues with block 825.

If block 875 determines that the current qTD is not the last qTD in the bank, process 800 continues with block 876. Block 876 follows the next qTD pointer to the next qTD in the same bank. Block 877 then executes the qTD pointed to by the next pointer. Process 800 continues with block 872.

For input devices, such as Ethernet controllers, hard drives, compact disk read-only-memory (CD-ROM) drives, CD-ROM Writer (CDRW) drives, etc., it is impossible for the host to know in advance how much data the device will return for any given transaction. For these devices, the HC initializes qTDs to account for the largest possible transaction that can be received from the device. The device then typically returns short packets to the host. By implementing the presented embodiments of the invention, efficiency of the HC driver is improved, in terms of memory footprint and bus utilization, in the presence of input devices, such as discussed above.

The above embodiments can also be stored on a device or machine-readable medium and be read by a machine to perform instructions. The machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.). The device or machine-readable medium may include a solid state memory device and/or a rotating magnetic or optical disk. The device or machine-readable medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:
    determining whether execution of a first queue element transfer descriptor (qTD) in a first bank including a plurality of qTDs results in a short packet condition;
    following an alternate pointer in the first bank that points to a second bank if execution of the first qTD resulted in the short packet condition;
    following a next pointer to a second qTD in the first bank if the execution of the first qTD completed normally;
    executing the second qTD in the first bank, determining whether execution of a buffer contents completed execution and completed without a short packet condition if a size of contents in the first buffer is greater than a storage capacity in the first bank;
    asserting an interrupt to a host controller driver;
    clearing status of the first qTD and initializing the first qTD; and
    using the first qTD as overflow for the contents of the first buffer;
    wherein the qTDs in the first bank and the second bank are circularly linked.
2. The method of claim 1, wherein the host controller driver coupled to an enhanced host controller interface (EHCI) host controller.
3. The method of claim 1, further including:
    determining whether contents of the first buffer is one of less than and equal to a storage capacity for the first bank;
    determining whether a qTD is the last qTD in the first bank; and
    executing the first qTD in the first bank if the last qTD in the first bank completed execution without a short packet condition.
4. The method of claim 1, further including:
    posting of a plurality of buffers to a host controller driver; and
    creating a bank including a plurality of qTDs for each of the plurality of buffers.
5. The method of claim 4, wherein a host controller directs the posting.
6. An apparatus comprising a machine-readable medium containing instructions which, when executed by a machine, cause the machine to perform operations comprising:
    determining whether execution of a first queue element transfer descriptor (qTD) in a first bank including a plurality of qTDs results in a short packet condition;
    following an alternate pointer in the first bank that points to a second bank if execution of the first qTD resulted in the short packet condition;
    following next pointer to a second qTD in the first bank if the execution of the first qTD completed normally;
    executing the second qTD in the first bank;
    determining whether execution of a buffer contents completed execution and completed without a short packet condition if a size of contents in the first buffer is greater than a storage capacity in the first bank;
    asserting an interrupt to a host controller driver; clearing status of the first qTD and initializing the first qTD; and
    using the first qTD as overflow for the contents of the first buffer, wherein the qTDs in the first bank and the second bank are circularly linked.
7. The apparatus of claim 6, wherein the host controller driver is coupled to an enhanced host controller interface (EHCI) host controller.
8. The apparatus of claim 6, further containing instructions which, when executed by a machine, cause the machine to perform operations including:
    determining whether contents of the first buffer is one of less than and equal to a storage capacity for the first bank;
    determining whether a qTD is the last qTD in the first bank; and executing the first qTD in the first bank if the last qTD in the first bank completed execution without a short packet condition.
9. The apparatus of claim 6, further containing instructions which, when executed by a machine, cause the machine to perform operations including:
    posting of a plurality of buffers to a host controller driver; and
    creating a bank including a plurality of qTDs for each of the plurality of buffers.
10. The apparatus of claim 9, wherein a host controller directs the posting.

* * * * *